US012125329B2

(12) United States Patent
Mukundala et al.

(10) Patent No.: US 12,125,329 B2
(45) Date of Patent: Oct. 22, 2024

(54) METHOD AND SYSTEM FOR SWITCHING THE PREMISES

(71) Applicant: Carrier Corporation, Palm Beach Gardens, FL (US)

(72) Inventors: Sumanth Kumar Mukundala, Telangana (IN); Aswin Sukumaran Nair, Telangana (IN); Nagamalleswara Rao Ravi, Telangana (IN); Bhanu Kiran Kamireddy, Telangana (IN); Rakesh Sirigiripet, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/769,489

(22) PCT Filed: Sep. 29, 2020

(86) PCT No.: PCT/IB2020/059081

§ 371 (c)(1),
(2) Date: Apr. 15, 2022

(87) PCT Pub. No.: WO2021/074725

PCT Pub. Date: Apr. 22, 2021

(65) Prior Publication Data

US 2024/0135763 A1 Apr. 25, 2024
US 2024/0233465 A9 Jul. 11, 2024

(30) Foreign Application Priority Data

Oct. 18, 2019 (IN) ............................ 201911042307

(51) Int. Cl.
*G07C 9/00* (2020.01)

(52) U.S. Cl.
CPC ..... *G07C 9/00904* (2013.01); *G07C 9/00857* (2013.01)

(58) Field of Classification Search
CPC ........... G07C 9/00904; G07C 9/00857; G05B 19/00; G06F 7/00
(Continued)

(56) References Cited

U.S. PATENT DOCUMENTS 1,190,710 A 7/1916 Bethel
7,270,353 B2 9/2007 Sironi et al.
(Continued)

FOREIGN PATENT DOCUMENTS

EP 3156980 A1 4/2017
WO 2009094683 A1 8/2009
WO 2016089846 A1 6/2016

OTHER PUBLICATIONS

International Search Report for application PCT/IB2020/059081, dated Dec. 16, 2020, 4 pages.
(Continued)

*Primary Examiner* — Nam V Nguyen
(74) *Attorney, Agent, or Firm* — CANTOR COLBURN LLP

(57) ABSTRACT

Aspects of the invention are directed towards systems and methods for changing the premises in a building such as hotel or the like. A user sends to a request from a user device to a server for switching a first premises with the second premises. An access card is able to access the first premises. Based on the request, the server determines the second premises and generates access credentials for the second premises. The access credentials are transmitted to a first access terminal associated with the first premises and the access card is encoded with the access credentials to access the second premises and permitting entry inside the second premises.

18 Claims, 4 Drawing Sheets

(58) Field of Classification Search
USPC ........................................................ 340/5.7
See application file for complete search history.

(56) References Cited

U.S. PATENT DOCUMENTS

| | | | | |
|---|---|---|---|---|
| 7,336,170 | B2 | 2/2008 | Auerbach et al. | |
| 8,074,271 | B2 | 12/2011 | Davis et al. | |
| 8,730,004 | B2 * | 5/2014 | Elfstrom | G07C 9/27 340/5.2 |
| 9,317,018 | B2 * | 4/2016 | Spodak | G06K 7/01 |
| 9,858,740 | B2 * | 1/2018 | Borg | G07C 9/00817 |
| 11,004,161 | B2 * | 5/2021 | Nishida | G06Q 50/12 |
| 11,238,681 | B2 * | 2/2022 | Kuenzi | G07C 9/00309 |
| 11,257,315 | B2 * | 2/2022 | Kuenzi | H04W 4/80 |
| 11,315,081 | B2 * | 4/2022 | Fujimura | G06Q 10/06 |
| 11,380,152 | B2 * | 7/2022 | Kanteti | G07C 9/27 |
| 11,675,979 | B2 * | 6/2023 | Tsuji | H04L 51/52 704/9 |
| 2011/0187493 | A1 | 8/2011 | Elfstroem et al. | |
| 2015/0199863 | A1 | 7/2015 | Scoggins et al. | |
| 2016/0005248 | A1 | 1/2016 | Aase | |
| 2019/0182260 | A1 | 6/2019 | Patel et al. | |
| 2019/0309539 | A1 | 10/2019 | Mukundala et al. | |
| 2024/0112514 | A1 | 4/2024 | Mukundala et al. | |

OTHER PUBLICATIONS

Written Opinion for applciation PCT/IB2020/059081, dated Dec. 16, 2020, 4 pages.
International Search Report for application PCTIB2020/059077, dated Jan. 18, 2021, 4 pages.
Written Opinion for application PCT/IB2020/059077, dated Jan. 18, 2021, 4 pages.

* cited by examiner

METHOD AND SYSTEM FOR SWITCHING THE PREMISES

TECHNICAL FIELD OF INVENTION

The present invention generally relates to access control systems. More particularly, the invention relates to an apparatus and a method for switching premises in a convenient way by using the access control systems.

BACKGROUND OF THE INVENTION

Currently, a user may easily book a premises in a hotel through a hotel website or by using an application in a user device or by making a call at the hotel. Once the premises is booked, the user may be notified with booking information such as date of booking, a time period of stay, type of room, or services opted by the user. Alternatively, the user may use a user application on a user terminal to store the details of the booking. When the user checks in at the hotel, the user shows the booking information to a hotel staff at a front desk of the hotel and the hotel staff allocates a premises as well as a physical access card to the user for accessing the premises. Alternatively, the user may use mobile credentials to access the premises. The access card may be encoded with details for accessing the premises allocated to the user. Once the user enters the premises (or a room) and finds that the premises is not suitable for one or more reasons, the user generally ask for a change of the allocated premises.

The user needs to either make a call to the hotel staff or at the reception of the hotel or walk all the way down to the front desk of the hotel. At the reception, there can be waiting time involved where the hotel staff may be busy in catering to other requests or may not be available. On getting the turn, the user requests for a change of premises at the front desk. The hotel staff can allocate a different premises by encoding a separate access card for a new allocated premises. This consumes a lot of time of the user as well the of hotel staff. Moreover, such a process is manually intensive for the user. Also, the waiting time involved in the process of changing the premises can be agonizing for the user. Such an activity of changing a premises is frequent in hotels.

In view of the afore-mentioned problems in the existing solutions, there is a need of an efficient and effective system and a method for providing a solution to reduce waiting time of a user for changing a premises. There is also a need to reduce manual task involved for a user while changing a premises. There is also a requirement for providing an easy solution for encoding an access card. In order to solve the problems in the existing solutions, an apparatus and a method are disclosed.

SUMMARY OF THE INVENTION

Various embodiments of the invention describe a method for accessing the premises and also seamlessly changing the premises. The invention describes receiving a request from a user device for switching a first premises with a second premises. The second premises is determined in response to the request. Access credentials are generated for the second premises. The generated access credentials are then transmitted to the first access terminal to encode the access card with the access credentials for accessing a second access terminal associated with the second premises and permitting entry inside the second premises.

In an embodiment of the invention, the request for switching the first premises with the second premises is transmitted using an application stored in the user device.

In another embodiment of the invention, the request is transmitted to a server by establishing a first communication channel between the user device and the server.

In yet another embodiment of the invention, the server transmits the access credentials to the first access terminal through the first communication channel. The first communication channel corresponds to a cellular communication channel or a Wi-Fi communication channel.

In still another embodiment of the invention, the second premises is determined from a plurality of second premises.

In another embodiment of the invention, the first access terminal encodes the access card with the access credentials by establishing a second communication channel between the first access terminal and the access card.

In another embodiment of the invention, the second communication channel between the first access terminal and the access card corresponds to a near-field communication channel.

In yet another embodiment of the invention, the second premises is determined for a period for which the first premises is reserved.

In another embodiment of the invention, the access credentials are not generated when the second premises is not available for a period for which the first premises is reserved.

In a different embodiment of the invention, the user device receives a message for cancellation of a reservation of the first premises and a confirmation for reservation of the second premises when the second premises is available.

In another embodiment of the invention, the access credentials for the second premises are transmitted to a front desk system.

In another embodiment of the invention a server is disclosed. The server comprises a receiver for receiving a request from a user device for switching a first premises with a second premises. The first premises is accessed using an access card on a first access terminal associated with the first premises. The server comprises a determination unit for determining the second premises in response to the request and a credential unit for generating access credentials for the second premises. A transmitter unit of the server is adapted to transmit the access credentials to the first access terminal to encode the access card with the access credentials for accessing a second access terminal associated with the second premises and permitting entry inside the second premises.

In another embodiment of the invention, the request for switching the first premises with the second premises is transmitted to a server by establishing a first communication channel between the user device and the server.

In yet another embodiment of the invention, the transmitter is adapted to transmit the access credentials to the first access terminal through a first communication channel.

The first communication channel corresponds to a cellular communication channel or a Wi-Fi communication channel.

In still another embodiment of the invention, the second premises is determined from a plurality of second premises.

In another embodiment of the invention, the first access terminal encodes the access card with the access credentials by establishing a second communication channel between the first access terminal and the access card.

In another embodiment of the invention, the second communication channel between the first access terminal and the access card corresponds to a near-field communication channel.

In still another embodiment of the invention, the second premises is determined for a period for which the first premises is reserved.

In yet another embodiment of the invention, the access credentials are not generated when the second premises is not available for a period for which the first premises is reserved.

In various other embodiments of the invention a computer readable medium is disclosed comprising one or more processors and a memory coupled to the one or more processors. The memory stores instructions executed by the one or more processors to receive a request from a user device for switching a first premises with a second premises. The first premises is accessed using an access card on a first access terminal associated with the first premises. The one or more processors are configured to determine the second premises in response to the request and generate access credentials for the second premises. The one or more processors are further configured to transmit the access credentials to the first access terminal to encode the access card with the access credentials for accessing a second access terminal associated with the second premises and permitting entry inside the second premises.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Figure 1:
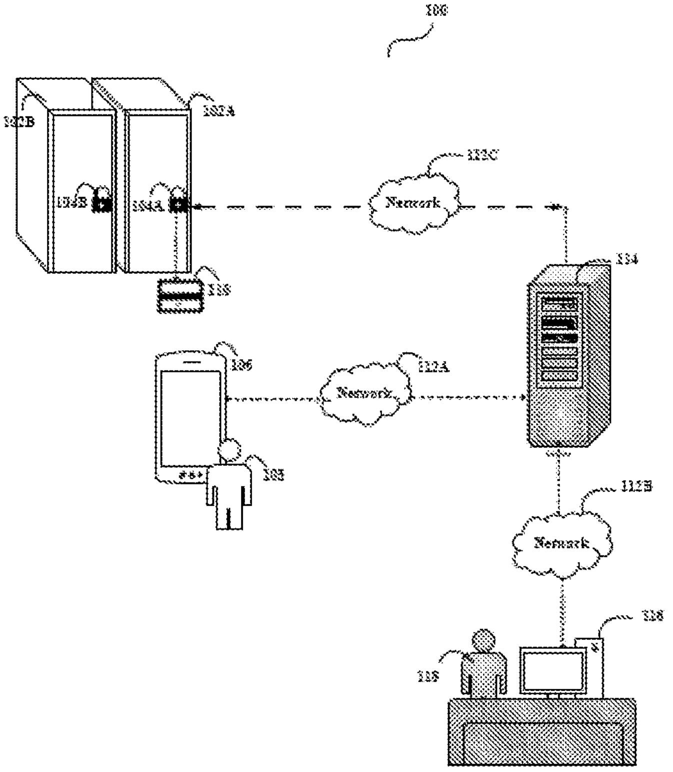
FIG. 1 is an exemplary block diagram illustrating different components of a system according to an exemplary embodiment of the invention.

Described herein is the technology with systems, methods, and devices for providing seamless mechanism for switching or changing premises such as a hotel room and the like. The technology provides reducing the waiting time for a guest while changing a room by providing instant access to different premises based on a request from a guest.

Various embodiments of the invention describe a method of switching premises in a building, hotel and the like. As an example, a guest may enter a hotel and checks-in for the premises (room) reserved for him. The guest is provided with an access card to access the premises at a front desk by a hotel staff. The access card may be used at a first terminal associated with the first premises for gaining entry inside the first premises. On entering the room, if the guest determines that the premises is not suitable for him or if the guest is not satisfied with the premises (hereinafter "first premises"), the guest may opt to switch the first premises with a second premises.

The user or guest may use an application on his/her user device to send a request to a server for requesting a change of first premises with the second premises. The user may be an authorized user who already has booked the first premises which has not cancelled and now wants to switch the first premises with any other premises. By using the present invention for switching the first premises with any other premises, the user need not approach or make a call to a hotel staff or at a reception. The server identifies the second premises (alternative premises) for replacing the first premises with the second premises for period of stay. The server also generates access credentials for using the second premises. The generated access credentials are transmitted to the first terminal. The guest may then encode the access card at the first terminal using a short-range communication by access credentials. The access credentials are encoded in the access card and the guest may use the encoded access card for gaining entry inside the second premises.

In an embodiment of the invention, the user application may be associated with a hotel, building and the like comprising the premises. The user application may be installed on a user device. The user application is able to interact with a server/cloud associated with the hotel, building, and the like. The user application may include the details of the user regarding the period of stay, access details, premises type, privileges associated with the premises and the like. The user application may also provide a user interface to communicate with the hotel staff at the front desk and the like.

The user device used by the guest can be a desktop computer or a hand held device such as a user terminal or a smartphone with at least a display, a storage unit and with network connectivity. Example of the user device includes a laptop, a smart phone, a tablet, and the like. As an example, the user device may be an Apple® smartphone, an Android® smartphone, a Windows® smartphone and/or the like. In general, an operating system available on the user device provides an interface for the user or guest to interact with the server and the first terminal for switching the premises. In an example, the operating system installed on the user device is a Windows® based operating system, a Mac® based operating system, and a Linux® based operating system or any other operating system known in the art.

In an embodiment of the invention, the user device is operable to be connected with the server using a first communication channel. The first communication channel is established to send a request for switching the first premises with the second premises. The server looks for the second premises from the plurality of second premises which are available for the user. On determining the second premises, the server generates access credentials. The details of the second premises and the access credentials are transmitted to first terminal associated with the first premises. The user can encode the access card from the first terminal based on the details and the access credentials of the second premises.

In another embodiment of the invention, the server has processing capabilities as disclosed further in the specification. The server may be a cloud storage, a remote database, or any such storage known in the art. The server is further configured to interact with the first terminal associated with the first premises, a second terminal associated with the second premises, the front desk system, user device associated with the guest and the like. The server may be a computing system connected via network with various components and devices.

In an embodiment of the invention, the communication channel may be established in a network. The network may be referred to a mesh network, Global System for Mobile (GSM) network, a Long-Term Evolution (LTE) network, a code-division multiple access (CDMA) network, a narrowband internet of thing (NB-IoT) technique or category M1 technique, a bluetooth network, a WiFi network, a ZigBee network or any such network/technique that is known in the art.

In an embodiment of the invention, the first access terminal may be installed on the first premises and the second access terminal may be installed on the second premises. The first access terminal or the second access terminal may comprise, but is not limited to, a transmitter, a receiver, a bluetooth unit, a near-field communication unit, an encoding unit, a keypad, an interface, a processor, a memory, and the like. The accessing device may be a lock, a smart lock, an electro-mechanical lock or any such device as understood by a person skilled in the art. Also, the premises can be a building, a room with a door or a floor where the terminal such as the access terminal can be installed.

In an embodiment of the invention, the access card is disclosed. The access card may be a Radio Frequency Identification (RFID) card or a Bluetooth enabled card and the like for accessing the premises. The accessing card includes a receiving unit to receive the details and access credentials of the second premises while communicating with the first terminal using a short-range communication. The short-range communication may be a Bluetooth communication, near-field communication (NFC), and a Wi-Fi communication as known to a person skilled in the art.

For the sake of brevity, the disclosure describes changing the premises from the first premises to the second premises. However, the premises can be changed a number of times one after the other based on the availability of the premises. Further, the second premises can be selected from a plurality of available second premises.

FIG. 1 depicts a system 100 for changing the premises using an access system in a convenient way. The system 100 includes a user/guest 108 with a user device 106 and an access card 110. The access card 110 is encoded and provided to the user at the front desk system 116 which is operated by a hotel staff 118. The access card 110 is used to gain entry inside the premises 102A. On entering the premises 102A, if the user is not satisfied with the premises 102A, the guest is provided an option to switch the premises. For example, the user may not be satisfied with the location, services, one or more equipments provided and the like. In such a case, the user has an option to change or switch the premises. The user using the user device 106 may send a request to a server 114 via network 112A for switching the premises. The user may use a user application installed on the user device 106 for sending the request. In an embodiment of the invention, the user application is related to the premises.

The request from the user device 106 is received by the server 114. The server may also be connected online via network 112C to the terminals or locks associated with the premises 102A and 102B. The server is further connected to a front desk system 116 via network 112B. The server 114 may identify a second premises (for example, 102B) as an alternative to the premises 102A. On identification of the second premises 102B, the server 114 may generate the details and access credentials for the second premises 102B. The details and the access credentials for the premises 102B are sent to a first terminal or lock 104A associated with the first premises 102A. The server 114 may also send a message to the user on the user device 106 indicating that the details and access credentials for the second premises 102B are transmitted to the first terminal 104A. Further, the user device 106 may also receive a message regarding cancellation of reservation for the first premises and reservation of the second premises for the period of stay.

In case the second premises 102B is not available, a message is sent to the user 108 regarding unavailability of the alternative premises. In such a case, the access credentials are not generated and are not transmitted to the first terminal 104A.

The user 108 may encode the access card 110 directly at the first terminal 104A once the details and access credentials second premises 102B are received at the first terminal 104A. Alternatively, the details and access credentials of the second premises are transmitted from the server 114 to the front desk system 116. The user may get the access card encoded by the hotel staff 118 at the front desk system 116. The access card 110 thus encoded may be used to seamlessly access the second terminal 104B for gaining entry inside the second premises. The same access card 110 is used with different access credentials at second terminal 104B to gain entry inside the second premises 102B.

In an exemplary embodiment of the invention, the user 108 may reserve the first premises 102A for a period of Nov. 5, 2019 to Nov. 7, 2019. The user device 106 may establish a cellular communication channel or a Wi-Fi communication channel over a network 112A with a server 114 and may transmit a reservation request for the first premises 102A to the server 114 through the cellular communication channel or the Wi-Fi communication channel. The server 114 may confirm the reservation of the first premises 102A for the period to the user device 106.

Once the user checks-in on Nov. 5, 2019 for the first premises 102A and the user is not satisfied with the first premises 102A, the user is provided an option to switch the room as discussed above. The server 114 may receive a request for switching the premises and determines alternate premises 102B for Nov. 5, 2019 to Nov. 7, 2019. The server determines the second premises 102B based on the privileges, type of first premises and the like and allocates the second premises 102B as discussed above. If the server could not find any second premises for Nov. 6, 2019, and if second premises is available from Nov. 6, 2019, the server may provide a message to the user that "second premises is available from Nov. 6, 2019 to Nov. 7, 2019." The example provided herein is exemplary and various modifications and arrangement to the concept is within the scope of the invention.

Figure 2:
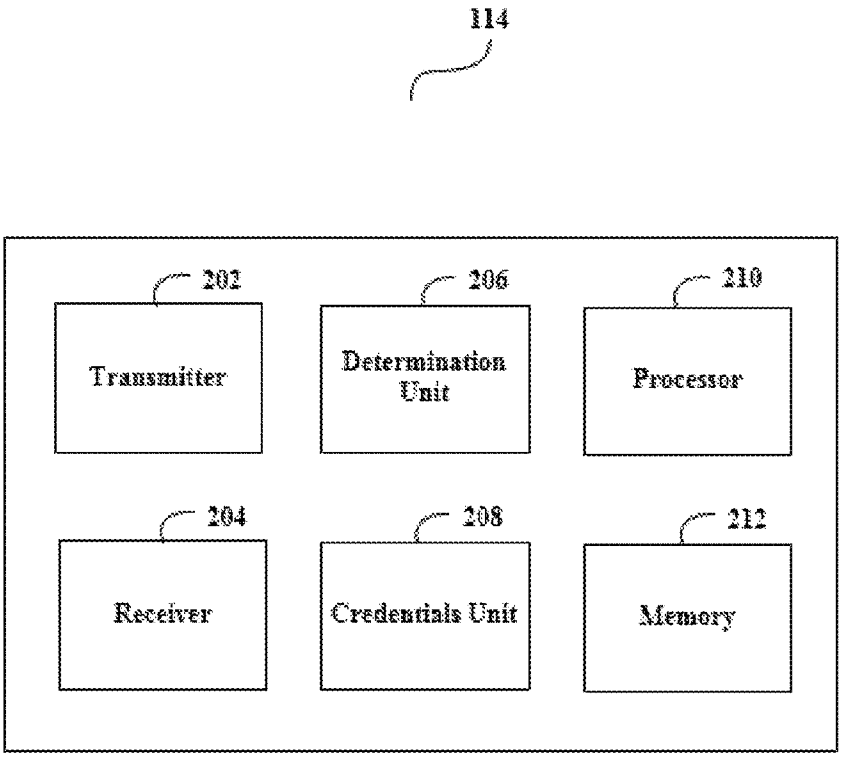
FIG. 2 is an exemplary block diagram of different components of a server according to an exemplary embodiment of the invention.

FIG. 2 depicts an embodiment of the invention with details of the server 114 including different components of the server for enabling the invention. The server 114 includes a transmitter 202 for transmitting the access credentials and details of the second premises to the first terminal 104A as discussed above. The server also includes a receiver 204 for receiving a request from the user device 106 for changing the premises from first premises 102A to second premises 102B. A determination unit 206 of the server is used to determine and select the second premises

102B as an alternate to the first premises 102A. The determination unit 206 selects the second premises 102B from a list including plurality of second premises. The determination unit 206 may take into account the type of premises to be allocated to the user, the privileges to be provided to the user and the like. The determination unit 206 further takes into account the period of stay at the premises.

Moreover, once the server 114 determines that the second premises 102B is available for switching, the server 114 may also transmit a message to the user device 106 informing the cancellation of the reservation of the first premises 102A and a reservation of the second premises 102B. As used herein, the details of the second premises 102B may comprise, but is not limited to, an identifier/number of the second premises 102B, a floor number where the second premises 102B is located, additional cost incurred for switching the first premises 102A with the second premises 102B, and/or the period for which the second premises 102B is allocated to the user 108.

The server 114 is associated with the credential unit 208. Once the determination unit 206 determines the second premises, the credential unit 208 may generate access credentials for the determined second premises. The access credential may be in the form of password, personal Identification number (PIN), a pattern, any unique code and the like. The server 114 further comprises a processor 210 and a memory 212 for execution of various features of invention executed by the server 114.

Figure 3:
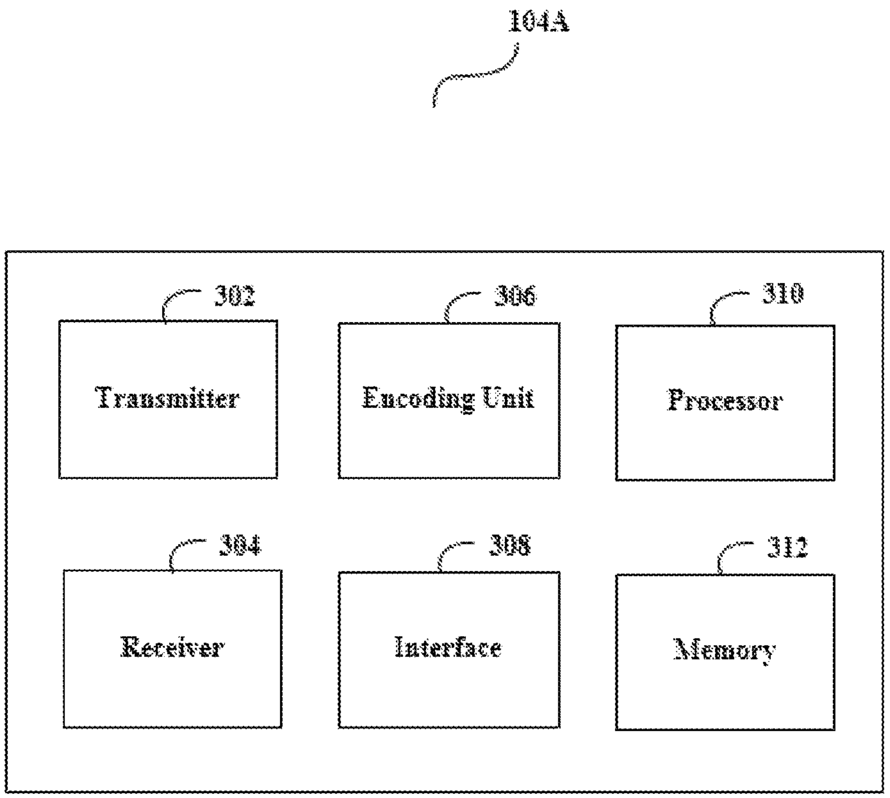
FIG. 3 is an exemplary block diagram of different components of a first terminal according to an exemplary embodiment of the invention.

FIG. 3 depicts the components of a terminal 104A associated with the first premises. As discussed above, the terminal 104A is configured to receive the details and access credentials for second premises 102B. The terminal 104A comprises a transmitter 302 for transmitting the received details and credentials of the second premises 102B to the access card 110. The details and the credentials are transmitted to the access card 110 thereby encoding the access card 110 for accessing the second premises 102B. The details and the access credentials are transmitted to the access card 110 after a communication is established between the terminal 104A and the access card 110. As used herein, the communication between the terminals and the access card may be a short-range communication. In an embodiment of the invention, the communication may be a Bluetooth communication, a Wi-Fi communication, or a near field communication (NFC). FIG. 3 further illustrates a receiver 304 configured to receive the details and access credentials for the second premises from the server 114. The receiver 304 may also to be configured to receive communication from the access card while encoding.

The communication between the server 114 and the terminal 104A may be a cellular communication, a Wi-Fi communication and the like known to a person skilled in the art.

The terminal 104A further includes an encoding unit 306 configured to encode the details and access credentials for the second premises inside the access card by establishing a communication between the terminal and the access card 110. The terminal 104A may also include an interface 308 for the user to interact with the terminal. The interaction may be to gain access inside the premises and may also be to initiate encoding of the access card for the second premises.

The interface of the terminal may be a touch-based terminal, numeric key based terminal and the like to receive input from the user 106.

Various components and units of the server 114 and the first terminal 104A are described herein. However, the invention may be performed by a single unit, fewer units, or more units of the server 114 and the first terminal 104A and the units provided herein are exemplary.

Figure 4:
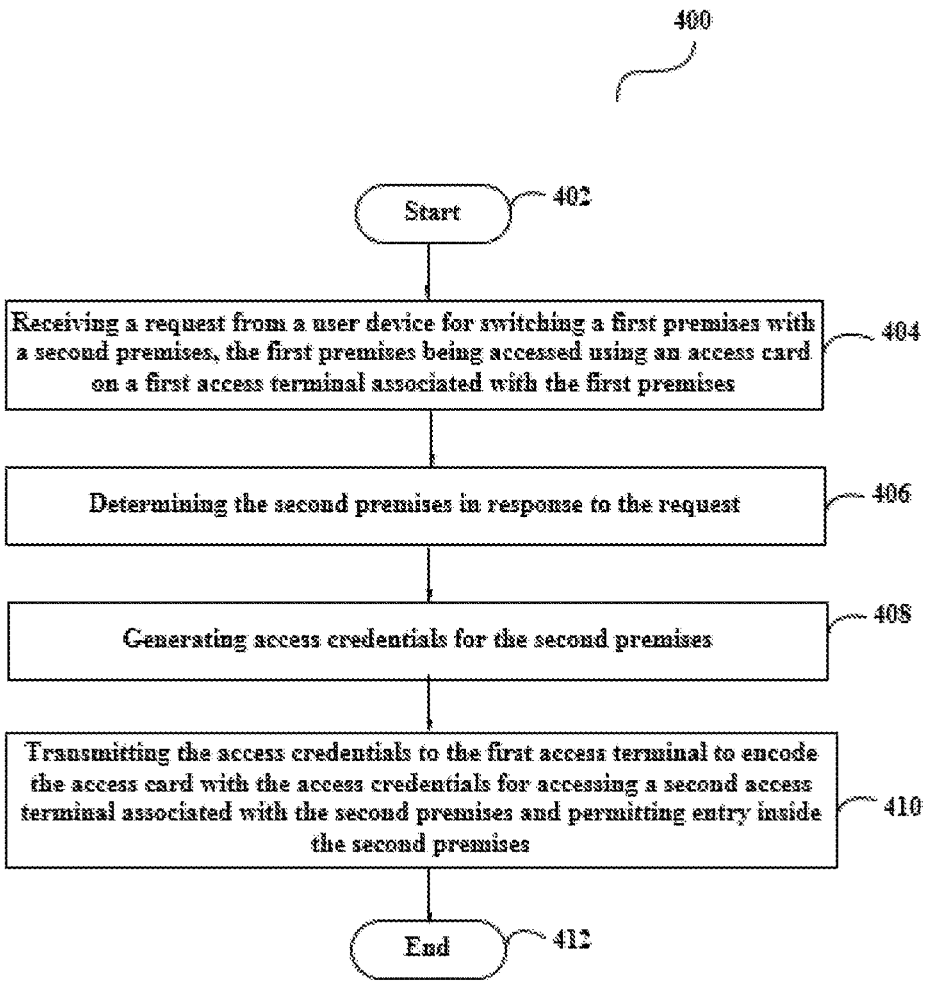
FIG. 4 is an exemplary flowchart illustrating a method to perform the invention according to an exemplary embodiment of the invention.

FIG. 4 depicts a flowchart outlining the features of the invention in an embodiment of the invention. The flowchart 400 describes a method being performed for enabling the invention. The method starts at 402 by receiving a request from a user terminal for switching a first premises 102A with second premises 102B. The first premises is accessed using an access card 110. The request on the user terminal is initiated by a guest associated with the user terminal at 404.

At 402, in response to the request, the second premises as an alternative to the first premises is determined.

At 408, based on the second premises determined, access credentials of the second premises are determined.

Further at 410, the access credentials related to the second premises are transmitted to the first terminal associated with the first premises, the access credentials are encoded to the access card for accessing the second premises and permitting entry inside the second premises. The method ends at 412.

In various embodiments of the invention described is a computer readable medium comprising one or more processors and a memory coupled to the processors. The memory stores instructions executed by the one or more processors. The one or more processors are configured to receive a request from a user device 106 for switching a first premises with the second premises. The first premises and the second premises may be accessed by using an access card 110. The one or more processors are further configured to determine the second premises based on the request from the user device 106. The second premises may be selected from a plurality of second premises. The one or more processors are further configured to generate access credentials for the determined second premises. The generated access credentials along with the details of second premises are transmitted to the first terminal 104A associated with the first premises 102A. The details and the access credentials of the second premises are encoded in the access card 110 by the first terminal 104A. The one or more processors are configured to encode the access card 110 by establishing a communication between the first terminal 104A and the access card 110.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals.

Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures/Tables and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

We claim:

1. A method comprising:

receiving a request from a user device for switching a first premises with a second premises, the first premises being accessed using an access card encoded with access credentials for accessing a first access terminal associated with the first premises;

determining the second premises in response to the request;

generating access credentials for accessing a second access terminal at the second premises; and transmitting the access credentials for accessing the second access terminal to the first access terminal to encode the access card by switching the access credentials for accessing the first access terminal with the access credentials for accessing the second access terminal associated with the second premises and permitting entry inside the second premises;

wherein the access credentials for accessing the second access terminal are not generated when the second premises is not available for a period for which the first premises is reserved.

2. The method of claim 1, wherein the request for switching the first premises with the second premises is transmitted using an application stored in the user device.

3. The method of claim 1, wherein the request is transmitted to a server by establishing a first communication channel between the user device and the server.

4. The method of claim 3, wherein the server transmits the access credentials for accessing the second access terminal to the first access terminal through the first communication channel, wherein the first communication channel corresponds to a cellular communication channel or a Wi-Fi communication channel.

5. The method of claim 1, wherein the second premises are determined from a plurality of second premises.

6. The method of claim 1, wherein the first access terminal encodes the access card with the access credentials for accessing the second access terminal by establishing a second communication channel between the first access terminal and the access card.

7. The method of claim 6, wherein the second communication channel between the first access terminal and the access card corresponds to a near-field communication channel.

8. The method of claim 1, wherein the second premises is determined for a period for which the first premises is reserved.

9. The method of claim 1, wherein the user device receives a message for cancellation of a reservation of the first premises and a confirmation for reservation of the second premises when the second premises is available.

10. The method of claim 1, wherein the access credentials for accessing the second access terminal for the second premises are transmitted to a front desk system.

11. A server comprising:

a receiver adapted to receive a request from a user device for switching a first premises with a second premises, the first premises being accessed using an access card encoded with access credentials for accessing a first access terminal associated with the first premises;

a determination unit adapted to determine the second premises in response to the request;

a credentials unit adapted to generate access credentials for accessing a second access terminal at the second premises; and a transmitter adapted to transmitting the access credentials for accessing the second access terminal to the first access terminal to encode the access card by switching the access credentials for accessing the first access terminal with the access credentials for accessing the second access terminal associated with the second premises and permitting entry inside the second premises;

wherein the access credentials for accessing the second access terminal are not generated when the second premises is not available for a period for which the first premises is reserved.

12. The server of claim 11, wherein the request for switching the first premises with the second premises is transmitted to a server by establishing a first communication channel between the user device and the server.

13. The server of claim 11, wherein the transmitter is adapted to transmit the access credentials for accessing the second access terminal to the first access terminal through a first communication channel, wherein the first communication channel corresponds to a cellular communication channel or a Wi-Fi communication channel.

14. The server of claim 11, wherein the second premises are determined from a plurality of second premises.

15. The server of claim 11, wherein the first access terminal encodes the access card with the access credentials for accessing the second access terminal by establishing a second communication channel between the first access terminal and the access card.

16. The server of claim 15, wherein the second communication channel between the first access terminal and the access card corresponds to a near-field communication channel.

17. The server of claim 11, wherein the second premises is determined for a period for which the first premises is reserved.

18. A non-transitory computer readable medium comprising memory storing instructions executed by one or more processors, the one or more processors configured to:

receive a request from a user device for switching a first premises with a second premises, the first premises being accessed using an access card encoded with access credentials for accessing a first access terminal associated with the first premises;

determine the second premises in response to the request;

generate access credentials for accessing a second access terminal at the second premises; and transmit the access credentials for accessing the second access terminal to the first access terminal to encode the access card by switching the access credentials for accessing the first access terminal with the access credentials for accessing the second access terminal associated with the second premises and permitting entry inside the second premises;

wherein the access credentials for accessing the second access terminal are not generated when the second premises is not available for a period for which the first premises is reserved.

* * * * *